United States Patent

[11] 3,549,057

[72] Inventor Ernesto M. Perez
1213 N. Gordon St., Hollywood, Calif. 90038
[21] Appl. No. 808,470
[22] Filed Mar. 19, 1969
[45] Patented Dec. 22, 1970

[54] METERING DISPENSER FOR VISCOUS MATERIALS
10 Claims, 11 Drawing Figs.

[52] U.S. Cl. .................................................... 222/249
[51] Int. Cl. .................................................... G01f 11/04
[50] Field of Search ........................................... 222/249, 250; 73/239

[56] References Cited
UNITED STATES PATENTS
3,388,839 6/1968 Frydenberg .................. 222/249X Primary Examiner—Donald F. Norton
Attorney—Albert L. Gabriel ABSTRACT: A dispenser for metering out equal measures of any pasty substance from a pressure-ejection type of container therefor, such as a collapsible squeeze tube. Metering is accomplished by one stroke of a double-acting, free-floating piston within a dispenser body adapted to be fixedly secured to the container. A cover shell is rotatable about the body between the first and second dispensing positions wherein the cover exposes a respective first or second dispensing orifice, the cover shell being coupled to the valve means in the body which controls the flow of the substance to opposite sides of the piston at the respective dispensing positions of the cover. Movement of the cover shell of either dispensing position toward the other automatically closes the dispenser and cleanly cuts off a dispensed ribbon of such highly viscous materials as toothpaste.

PATENTED DEC 22 1970

INVENTOR.
ERNESTO M. PEREZ

By Huebner & Worrel
ATTORNEYS.

PATENTED DEC 22 1970 3,549,057

INVENTOR
ERNESTO M. PEREZ
By Huebner & Worrel
ATTORNEYS.

METERING DISPENSER FOR VISCOUS MATERIALS

BACKGROUND OF THE INVENTION

Many pasty or viscous household products are sold in elongated, collapsible tubes which have a dispensing nozzle at one end upon which a removable cap is placed, usually by threaded engagement. Typical of products which are sold in this type of container are toothpaste, hair dressing, hand and skin creams, shampoo, shaving cream, and a variety of other products. In the case of most products which are packaged in this manner, it is desirable to dispense the same amount of the substance each time the container is used, and generally only a short ribbon of the material is desired. However, without the addition of a special metering dispenser to the tube, it is impossible to dispense the material in equal measures, and usually too little or too much of the material will be dispensed. This problem is particularly evident when children attempt to dispense the right amount of toothpaste. This typical uncontrolled dispensing of a pasty or viscous material from a collapsible tube type of container frequently leads to considerable wastage of the material.

Another objectionable feature of the conventional collapsible tube-type of dispenser for pasty or viscous materials is that the cap must be unscrewed each time it is desired to use the material, and then after the dispensing operation, the cap must be screwed back onto the tube.

A still further problem in using such conventional collapsible tube type dispensers is that when a ribbon of the material has been squeezed out of the tube it cannot be conveniently cleanly broken or cutoff but is usually wiped or smeared off onto a toothbrush or the hand, which is generally unsanitary in the case of toothpaste or other hygienic material, and generally leaves the dispensing end of the tube smeared with paste which is not only messy but makes the cap more difficult to screw back into place.

Several types of metering devices have been proposed in the past for collapsible type dispensers, and although such devices have served the purpose of measuring out equal amounts of pasty materials, they have nevertheless been generally unsatisfactory because they have failed to cure one or more of the other problems pointed out hereinabove in connection with conventional collapsible tube-type paste or viscous material containers. Thus, for example, one such prior art metering device was shown and described in U.S. Pat. No. 3,388,839 to Frydenberg. That device generally resembled the conventional on-off plug valve employed in natural gas service valves, having a threaded coupling at one end of the valve for attachment to the paste container, a threaded nozzle at the other end of the valve for a removable cap, a short cylindrical housing inbetween the entrance fitting and the exit nozzle with its axis transverse to the general axis of the device, and a lug-actuated rotatable valve element in the cylindrical body having a bore within which a free-floating piston is disposed. The valve element is rotated so that the passage therethrough is aligned with the entrance and exit passages, and the paste container is squeezed to fill the passage with paste, moving the free-floating piston to the outer end thereof, thus loading the device. Then the log is rotated 180° and the container again squeezed to dispense the amount of paste contained in the rotatable element and reload the element.

Such prior art still requires the use of a cap which must be removed before the dispensing operation and replaced thereafter. Such device still makes no provision for sharp, clean cutoff of the dispensed ribbon, still leaving the mess and sanitation problem described above in connection with the conventional collapsible type container. Additionally, prior art devices of this type are generally unattractive and cumbersome to operate.

SUMMARY OF THE INVENTION

In view of these and other problems in the art, it is an object of the present invention to provide a novel measuring or metering dispenser for portioning out equal measures of any viscous or pasty substance from a pressure-ejection type of container such as a collapsible squeeze tube, wherein the measuring function is carried out by means of a double-action, free-floating piston located in a body portion of the dispenser that is adapted to be fixedly coupled to the container for the pasty or viscous material, and wherein operation of the device is controlled by means of a rotatable cover shell on the body, the cover shell being conveniently moved between a first dispensing position wherein it exposes a first dispensing orifice in the body and through valve means in the body coupled to the cover permits flow of the pasty or viscous material from the container to one side of the free-floating piston so that the piston moves to eject a measured amount of the material from its other side through the first dispensing orifice, and a second position of the cover wherein the cover exposes a second dispensing orifice and through the valve means allows the material to flow from the container to the other side of the free-floating piston to move the piston and dispense a similar measured amount of the material out through the second dispensing orifice, and wherein movement of the cover about the body from either of such dispensing positions toward the other causes automatic closure of the dispenser and causes a dispensed ribbon of the material to be cleanly cutoff at the body of the device.

Another object of the invention is to provide a measuring dispenser of the character described wherein the novel fixed body and rotatable cover shell combination avoids the necessity for using a separate cap which would otherwise have to be removed before and replaced after a dispensing operation.

Another and more general object of the present invention is to provide a novel metering dispenser of the character described which is simple in structure and economical to manufacture, being composed of small inexpensive parts which can be die cast, and which are easily assembled to form the complete structure.

Another general object of the invention is to provide a metering dispenser of the character described which is compact and attractive in appearance, and which is particularly simple to operate.

Further objects and advantages of this invention will appear during the course of the following part of this specification, wherein the details of construction and mode of operation of several preferred embodiments are described with reference to the accompanying drawings, in which:

DETAILED DESCRIPTION

Figure 1:
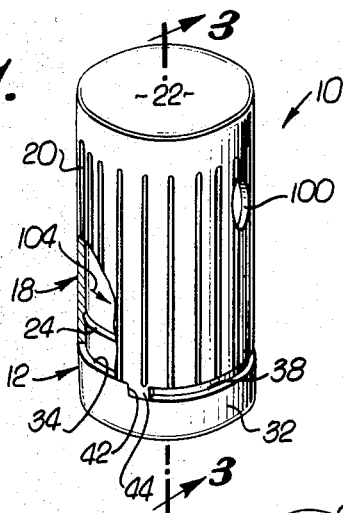
FIG. 1 is a perspective view, with a portion of the cover shell broken away, illustrating a metering dispenser made in accordance with the present invention, with the cover shell positioned relative to the body of the device in one dispensing position.

Reference will first be made to FIGS. 1 through 9 which illustrate a first form 10 of metering dispenser according to the invention. The dispenser 10 includes a generally cylindrical body 12 composed of a pair of substantially semicylindrical body members 14 and 16 which are substantially bilaterally symmetrical. A generally cup-shaped cover shell 18 having a cylindrical barrel 20 and a rearward end closure 22 is engaged over the body 12. The body has an external annular bead thereon which snaps into an internal annular groove 26 in the barrel 20 of the shell 18 to secure the shell on the body in the axial direction in their assembled relationship, but to allow rotational movement of the shell 18 about the body 12. The body 12 is preferably generally rigid in construction, and may be made of any suitable plastic, metal or other material which will hold its shape and tend to resist wear. The cover shell 18 is also preferably generally rigid, but should have sufficient flexibility or resiliency to allow the forward or open end portion thereof to be pushed over the external annular bead 24 on the body for engagement of the bead 24 within the annular groove 26 in the shell. Thus, the shell 18 is preferably composed of a plastic or hardened rubber type of material. However, it is to be understood that if desired the cover shell 18 may be made of a completely rigid material, as for example a suitable metal, and another type of axial lock which will allow rotation may be substituted for the bead 24 and groove 26, as for example a snapring type of engagement (not shown) wherein an expansible or contractible snapring is fitted into opposed grooves in both the body and shell.

The generally rectangular axial-sectional edge portion of body member 14 is provided with a rib or tongue 28 which fits into an opposed, complementary groove 30 in the other body member 16 for accurately orienting the body members 14 and 16 when they are engaged together to form the closed body structure 12. The tongue 28 and groove 30 combination also serves as a peripheral seal for the juncture between the body members 14 and 16 to prevent leakage of the pasty or viscous material from within the body 12 during operation of the dispenser 10.

Figure 2:
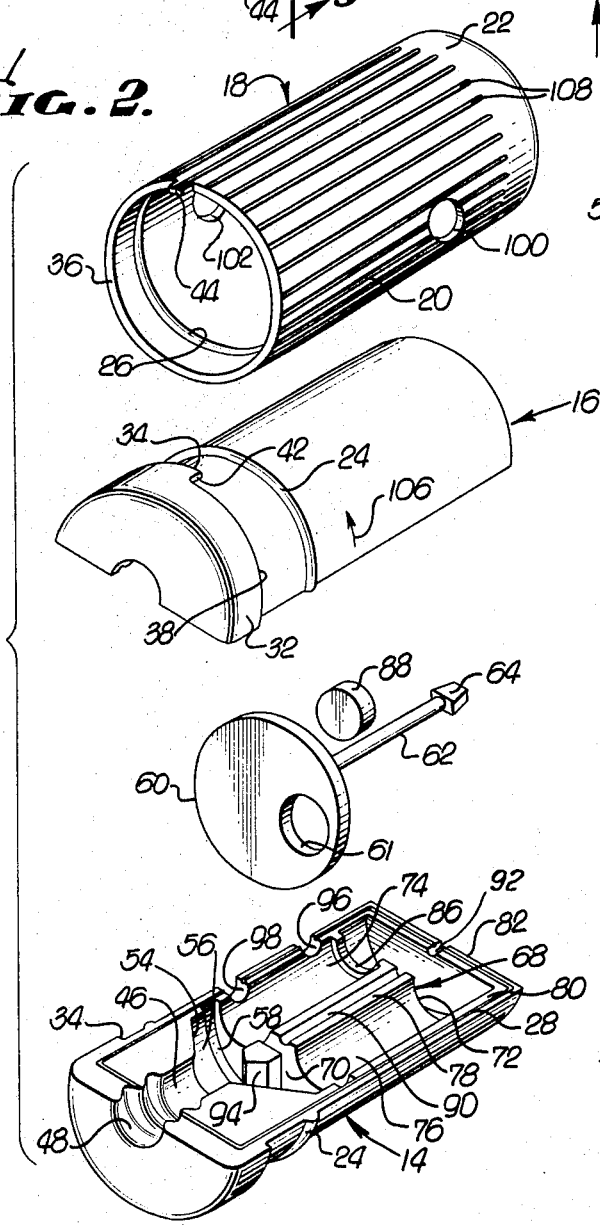
FIG. 2 is an exploded perspective view illustrating the parts of the invention in disassembled relationship.
Figure 9:
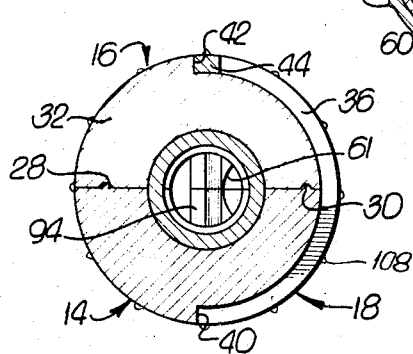
FIG. 9 is a cross-sectional view taken on the line 9-9 in FIG. 3.

The body 12 has a head portion 32 at its forward end which is diametrically enlarged to substantially the same diameter as the barrel portion 20 of cover shell 18, this enlarged head 32 projecting axially forwardly from the cover shell 18. The body head 32 has a rearwardly facing arcuate ledge 34 thereon adjacent which the forward end edge 36 of the cover barrel 20 is rotatable. The ledge 34 on the body head 32 extends through slightly less than 180° of the periphery of the body, and the remaining portion of the head 32 has an arcuate notch 38 therein which extends slightly more than 180°, the arcuate notch and arcuate ledge 34 defining therebetween a pair of stop shoulders 40 and 42. A tab 44 projects axially from the forward end edge 36 of the barrel 20 of the cover shell, extending into the arcuate notch 38 of the body head 32, and permitting substantially 180° of rotation of the cover shell 18 about the body 12 between a first dispensing position wherein the tab engages the shoulder 42 on the body section 16, and a second dispensing position wherein the tab 44 engages the shoulder 40 on the body section 14. This relationship between the cover shell tab 44, the body head notch 38, and the stop shoulders 40 and 42 is best illustrated in FIGS. 1, 2 and 9 of the drawings.

Figure 3:
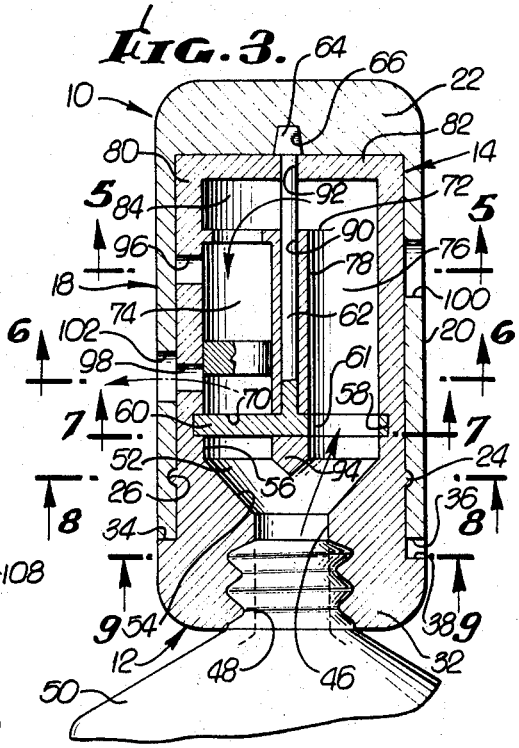
FIG. 3 is an axial sectional view of the invention taken on the line 3-3 in FIG. 1 illustrating the device operatively connected to a collapsible tube-type of paste dispenser, and with the cover shell rotatably positioned with respect to the body of the device in the dispensing position shown in FIG. 1.
Figure 4:
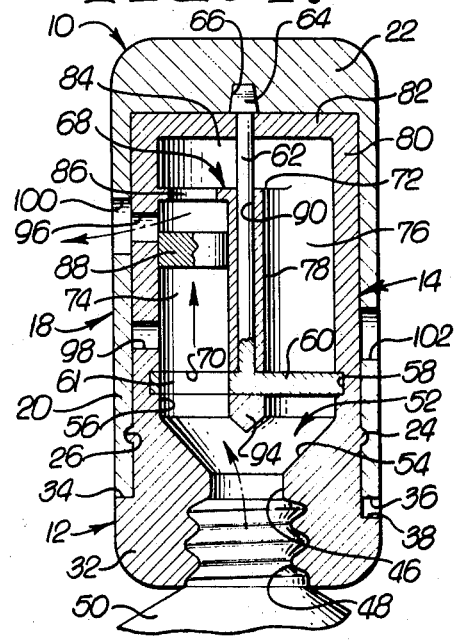
FIG. 4 is an axial sectional view similar to FIG. 3, but with the cover shell rotated 180° from the position shown in FIG. 3, to another dispensing position.
Figure 5:
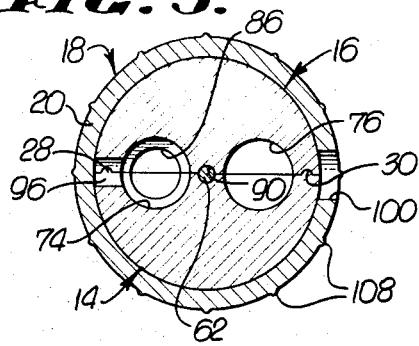
FIG. 5 is a cross-sectional view taken on the line 5-5 in FIG. 3.
Figure 6:
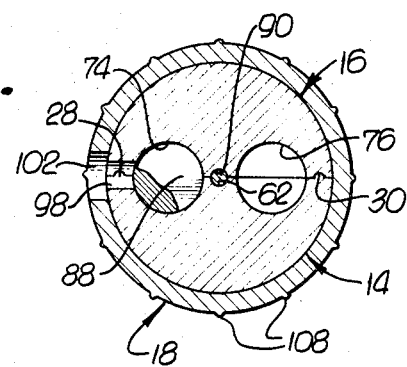
FIG. 6 is a cross-sectional view taken on the line 6-6 in FIG. 3.
Figure 7:
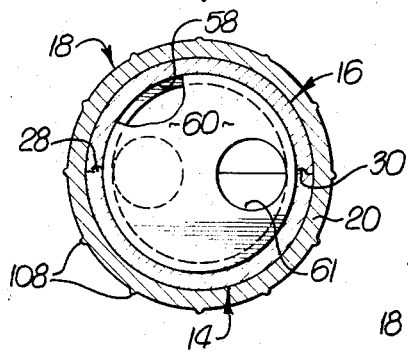
FIG. 7 is a cross-sectional view taken on the line 7-7 in FIG. 3.
Figure 8:
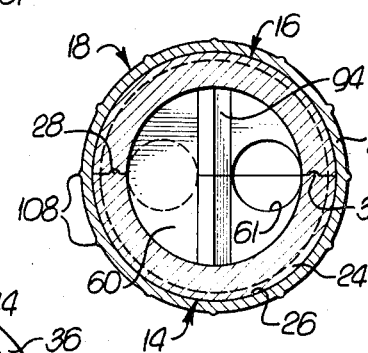
FIG. 8 is a cross-sectional view taken on the line 8-8 in FIG. 3.

Referring now particularly to the internal structure of the body 12, an axial entrance passage 46 extends through the head portion 32 of the body, and this entrance passage 46 may be provided with any suitable means for attachment of the body portion 12 of the device with a container for the pasty or viscous material that is to be dispensed. Thus, for example, internal thread means 48 may be provided in the entrance passage 46 for threaded connection of the body 12 with the externally threaded nozzle of a typical collapsible paste container 50 as illustrated in FIGS. 3 and 4 of the drawings.

The entrance passage 46 communicates with an entrance header chamber 52 comprised of a frustoconical portion 54 and a cylindrical portion 56, the latter terminating in a radially outwardly extending annular groove 58 within which a valve disc 60 is rotatably seated. The valve disc 60 has a single, circular port 61 therethrough, and an integral valve stem 62 projects axially rearwardly from the disc 60, terminating at its rearward end in a key 64 that is engaged within a complementary recess 66 in the end closure 22 of cover shell 18. The key 64 complementary recess 66 may have any desired irregular shape permitting engagement of the key in the recess when the parts are assembled, and providing rotational keying between the cover shell 18 and the valve stem 62 and hence the valve disc 60 so that rotation of the cover shell 18 about the body 12 will cause a corresponding rotational movement of the valve disc 60 within the body 12. The trapezoidal shape illustrated for the key 64 and complementary recess 66 is satisfactory for this purpose.

Immediately to the rear of the valve disc 60, the body 12 has a metering section generally designated 68, which has a forward transverse flat surface 70 against which the valve disc 60 rides. This metering section 68 extends rearwardly through the central portion of the body and terminates at a transverse rearward surface 72. A pair of parallel, cylindrical conduits 74 and 76 extend axially through this metering section 68 of the body between the forward and rearward transverse surfaces 70 and 72 thereof, respectively, with an axially centered intervening web 78 of the body material therebetween. As will be apparent from the further description hereinafter, the cylindrical conduit 74 functions in the capacity of a metering cylinder.

The body 12 also includes a cylindrical portion 80 thereof which extends rearwardly from the metering section 68, and terminates in a transverse rear end wall 82, to define a rear transfer header chamber or conduit 84 which allows the free flow of the pasty or viscous material between the conduits 74 and 76 of the metering section of the body. The communication between the conduit 74 of the metering section and the rear transfer header chamber 84 is slightly reduced by means of an annular flange 86 at the rear end of conduit 74 which serves as a rearward stop for a piston or plug 88 of the freefloating type which is slidably movable in either direction within the conduit or metering cylinder 74.

The central web 78 of the metering section 68 is provided with an axial passage 90 through which the valve stem 62 extends, the stem 62 also extending through an aperture 92 in the rear end wall 82 of the body and terminating as aforesaid in the key 64 which is engaged in the recess 66 of the cover shell end closure 22.

A divider wall 94 extends transversely across the entrance header chamber 52 of the body immediately forward of the valve disc 60, and has an angled leading edge which serves to guide the paste or other viscous material toward either of the cylindrical conduits 74 and 76 in the metering section of the body according to the positioning of the valve disc 60. The divider wall 94 also serves to assist in axially locating the valve disc 60.

Rearward and forward dispensing orifices 96 and 98, extend transversely through the wall of the body 12 from the inside of the metering cylinder 74 adjacent the respective rearward and forward ends of the latter. The cover shell 18 is provided in its cylindrical barrel portion 20 with a dispensing port 100 which is in the same longitudinal position in the dispenser as the rearward dispensing orifice 96, but preferably larger in diameter than orifice 96, and which comes into registry with the dispensing orifice 96 when the cover shell 18 is turned to the position illustrated in FIG. 4, which is 180° from the position illustrated in FIGS. 1, 2, and 9. The barrel part 20 of cover shell 18 also has a dispensing port 102 therein at the same longitudinal position in the dispenser as the dispensing orifice 98, but preferably larger in diameter than orifice 98, the port 102 coming into registry with the dispensing orifice 98 when the cover shell 18 is in rotational position relative to the body that is illustrated in FIGS. 1 to 3 and 5 to 9.

As soon as the cover shell 18 is rotated from either of the two dispensing positions of FIGS. 3 and 4 toward the other dispensing position, the registering dispensing orifice 96 or 98 and respective dispensing port 100 or 102 will be moved out of alignment so that the dispensing orifice 96 or 98 will become automatically covered by the barrel portion 20 of the cover shell 18, thereby completely eliminating the need for any separate cover cap or lid. Thus, when the dispensing orifice 98 is aligned with the dispensing port 102 as in FIG. 3, the dispensing orifice 96 is completely covered by the barrel 20 of the cover shell. On the other hand, as shown in FIG. 4, when the dispensing orifice 96 is aligned with the dispensing port 100, the dispensing orifice 98 is completely covered by the barrel portion 20 of the cover shell.

By dividing the body 12 along a plate which bisects both of the cylindrical conduits 74 and 76, both the molding and the assembly of the device are made simple. Assembly is accomplished by merely placing the valve disc 60 and piston or plug 88 in one of the semicylindrical body members 14 or 16, as for example moving these members into the body member 14 from the spaced positions illustrated in FIG. 2, then placing the other semicylindrical body member, as for example the member 16, into place on the first body member, and then simply engaging the cover shell 18 over the assembly of the two body members 14 and 16 and the valve disc 60 and piston or plug 88. During assembly the valve disc 60 is preferably oriented so that its port 61 is in alignment with the cylindrical conduit 76 of the metering section of the body, as illustrated in FIGS. 2 and 3, and then the cover shell 18 is oriented also as illustrated in FIGS. 2 and 3, so that the dispensing port 102 thereof will come into registry with the dispensing orifice 98 of the body, and the dispensing port 100 of the shell will be rotated 180° from the dispensing port 96 of the body. When the parts are assembled in this relationship, then the valve key 64 will fit into its complementary recess 66 in such a way that the valve port 61 will be correctly oriented relative to the dispensing ports 100 and 102 of the cover shell 18. This same assembled relationship of the parts, as best illustrated in FIG. 3, also is the proper positioning for loading of the device with the pasty or viscous material preparatory to usage thereof. Thus, with the device connected to the container such as the paste container 50 shown in FIGS. 3 and 4, and the parts disposed in this relationship, the device can be loaded simply by squeezing the paste container 50, which will cause the paste to flow through the entrance passage 46 into the entrance header chamber 52 in the body, and thence through the valve port 61, cylindrical conduit 76, and rear transfer header 84 into the metering cylinder 74, wherein the paste causes the piston 88 to move to its forwardmost position, allowing the cylinder 74 to become filled with paste.

When the dispenser is thus loaded, then the cover shell 18 is rotated slightly about the body 12, in the anticlockwise direction as illustrated in FIG. 1, or the clockwise direction as illustrated in FIG. 9, so that the shell closes off the dispensing orifice 98. In this position of the shell relative to the body an indicating arrow 104 on the outer cylindrical surface of the body will appear within the dispensing port 102, indicating that for the next dispensing operation, the cover shell 18 should be twisted relative to the body in the direction of the arrow 104, which is anticlockwise in FIG. 1, or clockwise in FIG. 9, until the shell tab 44 is stopped against the body stop shoulder 40, which is the position illustrated in FIG. 4, wherein the dispensing orifice 98 is closed by the cover shell, and the dispensing orifice 96 is aligned with the cover shell dispensing port 100, and the valve port 61 is aligned with the metering cylinder 74. Squeezing of the paste container 50 will then cause the paste to flow to the left as viewed in FIG. 4 through the entrance header chamber 52 and valve port 61 into the closed lower portion of the metering cylinder 74, thereby forcing the piston 88 rearwardly so that the piston 88 will eject a metered amount of the paste previously loaded into the cylinder 74 out through the dispensing orifice 96 and port 100. As soon as the piston 88 comes into complete registry with the dispensing orifice 96 so as to close off the orifice 96, either seating of the piston 88 against the flange 86, or the presence of the solid body of paste material to the rear of piston 88, will stop the piston 88 at this point and thereby terminate the flow of paste out through the dispensing orifice 96.

If the paste is so heavy and viscous as to not simply break off at the orifice 96 after completion of this dispensing measuring function, then a small amount of rotational movement of the cover shell 18 relative to the body 12 clockwise in FIG. 1 or anticlockwise in FIG. 9 will cause the cover shell at the edge of dispensing port 100 to cleanly shear off the dispensed ribbon of pasty material. When the cover shell has thus been twisted relative to the body sufficiently for the dispensing orifice 96 to be completely closed, then the dispensing port 102 will expose a second indicating arrow 106 on the outer cylindrical surface of the body to indicate the direction of movement of the cover shell 18 relative to the body which is to be applied for moving the shell to the next dispensing position, which is the dispensing position illustrated in FIG. 3.

When a dispensing operation is commenced with the shell and body members arranged as in FIG. 3, at the start of the dispensing operation the piston 88 will be rearwardly disposed in its covering relationship over the dispensing orifice 96. Squeezing of the container 50 will cause the paste to flow through entrance header 52 and valve port 61, thus moving paste already present in cylindrical conduit 76 and rear transfer header 84 so that paste will flow forwardly through flange 86, moving the piston 88 forwardly so as to eject paste ahead of piston 88 through the dispensing orifice 98 and dispensing port 102. When the piston 88 has moved into closing registry with the dispensing orifice 98, the piston will stop, either by engagement against the valve disc 60, or by the solid block of paste between the piston 88 and the valve disc 60, thereby stopping the flow of paste after dispensing the correct metered amount. The cover shell 18 is then again twisted back anticlockwise as viewed in FIG. 1 or clockwise as viewed in FIG. 9 a small amount so as to shear off the ribbon of paste and close off the dispensing orifice 98, at which point the indicating arrow 104 will again be exposed through the dispensing port 102.

A series of longitudinal gripping ribs 108 are preferably provided about the periphery of the cylindrical barrel 20 to facilitate the foregoing described manipulations of the cover shell 18.

Figure 10:
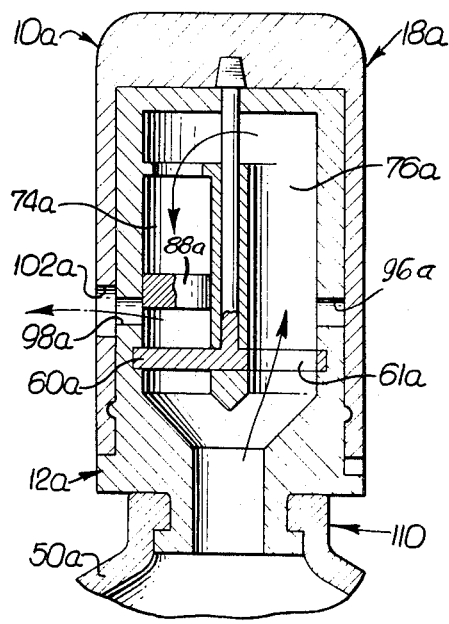
FIG. 10 is an axial sectional view of a modified form of the invention with the cover shell rotationally disposed relative to the body of the device in one dispensing position.
Figure 11:
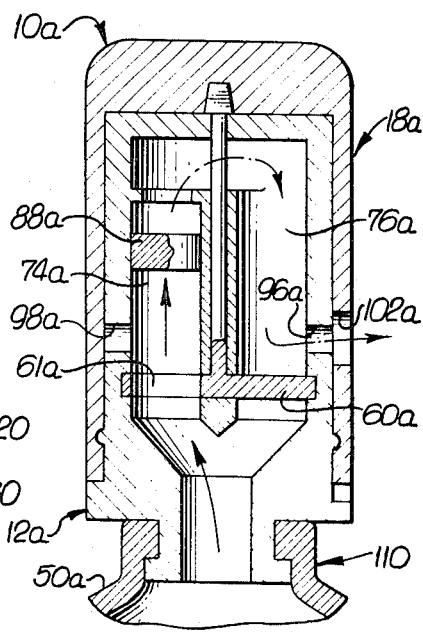
FIG. 11 is an axial sectional view similar to FIG. 10, but with the cover shell rotated 180° from the position of FIG. 10 to another dispensing position of the device.

Reference will now be made to FIGS. 10 and 11 which illustrate a modified form 10a of the present invention. The dispenser 10a has generally the same structure and operation as the dispenser 10 except for the provision of only a single dispensing port 102a in the cover shell 18a, and the repositioning of the dispensing orifice 96 as dispensing orifice 96a which communicates from the cylindrical conduit 76a to the outside of the body member 12a and is in the same position axially of the dispenser 10a as the dispensing orifice 98a, but is circumferentially displaced 180° from the dispensing orifice 98a.

Thus, with the cover shell 18a rotated to the position of FIG. 10, the dispensing port 102a will be moved into alignment with the dispensing orifice 98a and the valve disc 60a will be disposed so that its port 61a is aligned with the cylindrical conduit 76a, whereby the pasty or viscous material from container 50a will flow in the direction of the arrows in FIG. 10 to move the piston 88a forwardly and eject the material through orifice 98a and port 102a.

Rotation of the cover shell 18a through 180° from the position of FIG. 10 to the position of FIG. 11 will bring the valve port 61a into alignment with the metering cylinder 74a and will close off dispensing orifice 98a and open orifice 96a by alignment of dispensing port 102a therewith. Accordingly, in the position shown in FIG. 11, the pasty or viscous material will flow in the direction of the arrows to move the piston 88a rearwardly, thereby forcing the material out through the dispensing orifice 96a and port 102a.

The dispenser 10a differs from dispenser 10 by having a permanent connection 110 with the paste container 50a, thus illustrating the fact that a metering dispenser according to the present invention may be furnished as a permanent dispensing head on a container. In contrast, the dispenser 10, by having the threaded connection means 48, is adapted to be furnished separate from the container of the paste of other viscous material, and then attached to the container for use. With such construction the dispenser can be removed after the container has become empty and employed again with other containers for the same or similar products.

While the instant invention has been shown and described herein in what are conceived to be the most practical and preferred embodiments, it is recognized that departures may be made therefrom within the scope of the invention, which is therefore not to be limited to the details disclosed herein, but is to be accorded the full scope of the claims, so as to embrace any and all equivalent devices.

I claim:

1. A dispenser for metering viscous material from a pressure-ejection type container thereof, which comprises a body having entrance means connectable to said container for receiving viscous material therefrom, said body defining closed-circuit conduit means having first and second ends both of which communicate with said entrance means; first and second dispensing orifices connecting said conduit means with the outside of the body, said orifices being longitudinally spaced in said conduit means with said second orifice closest to said first end of the conduit means; a free-floating piston longitudinally movable in said conduit means generally intermediate said orifices between metering limits; valve means in the body movable between a first dispensing position opening said first end and closing said second end of said conduit means to direct said material in the conduit means so as to move the piston toward said first orifice to eject material through said first orifice, and a second dispensing position opening said second end and closing said first end of said conduit means to direct said material in the conduit means so as to move the piston toward said second orifice to eject material through said second orifice; and cover means movable on the body between a first dispensing position covering said second orifice and exposing said first orifice, and a second dispensing position covering said first orifice and exposing said second orifice.

2. A dispenser as defined in claim 1, which includes a connection between said cover means and said valve means whereby movement of said cover means between its said first and second dispensing positions causes corresponding movement of said valve means between its said first and second dispensing positions.

3. A dispenser as defined in claim 2, wherein said body is of generally elongated, cylindrical configuration having front and rear ends, with said entrance means located in said front end of the body, and said cover means being a generally cylindrical shell coaxially rotatably mounted on the body.

4. A dispenser as defined in claim 3, wherein said conduit means comprises first and second spaced, generally parallel conduit sections longitudinally arranged in the body, said first and second ends of the conduit means being respective forward ends of said first and second conduit sections, the rearward ends of said conduit sections being connected adjacent the rear end of the body.

5. A dispenser as defined in claim 4, wherein said cover shell has dispensing port means through the cylindrical wall thereof which is in registry with said first orifice and out of registry with said second orifice in said first dispensing position of the cover shell, and is in registry with said second orifice and out of registry with said first orifice in said second dispensing position of the cover shell.

6. A dispenser as defined in claim 5, wherein said piston is longitudinally slidable in said first conduit section, and said first and second dispensing orifices communicate with said first conduit section.

7. A dispenser as defined in claim 5, wherein said piston is longitudinally slidable in said first conduit section, and said first and second dispensing orifices communicate with the respective said first and second conduit sections.

8. A dispenser as defined in claim 4, wherein said valve means comprises a ported disc coaxially rotatable in said body.

9. A dispenser as defined in claim 8, wherein said cover shell has a rear end closure extending over the rear end of the body, and said connection between said cover means and said valve means comprises an elongated valve stem coupled at its ends to said valve disc and rear end closure, and extending axially through the rearward portion of the body.

10. A dispenser as defined in claim 4, wherein said body comprises two sections divided along a plane extending substantially through the axes of said conduit sections and the axis of the body, said sections being generally semicylindrical and bilaterally symmetrical.